Nov. 30, 1926.

A. D. SCULLY 1,608,536

MECHANICAL KNEE MOVEMENT DEVICE FOR ARTIFICIAL LIMBS

Filed July 8, 1925

ALEXANDER D. SCULLY
INVENTOR

BY John P. Nikonow
ATTORNEY

Patented Nov. 30, 1926.

1,608,536

UNITED STATES PATENT OFFICE.

ALEXANDER D. SCULLY, OF NEW YORK, N. Y.

MECHANICAL KNEE-MOVEMENT DEVICE FOR ARTIFICIAL LIMBS.

Application filed July 8, 1925. Serial No. 42,195.

My invention relates to mechanical knee movement devices for artificial limbs and has a particular reference to devices adapted to form hinged connections between upper and lower artificial limb portions.

The object of my invention is to provide a mechanism of the character above indicated which would have a limited freedom of movement similarly to the freedom of movement of a natural knee joint, which also would be provided with a means to maintain the joint tight and free from any lost motion which might develop as a result of wear.

I further provide means to eliminate the shocks and hammering noise when the joint is suddenly straightened.

My invention is more fully described in the accompanying specification and drawing in which—

Figure 1:
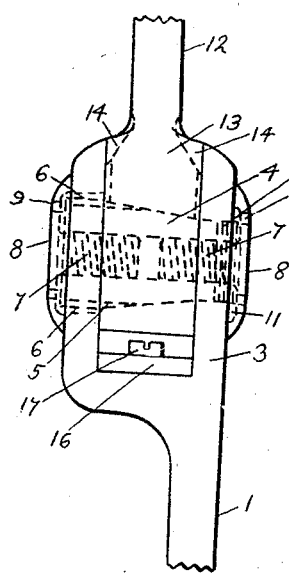
Figure 2:
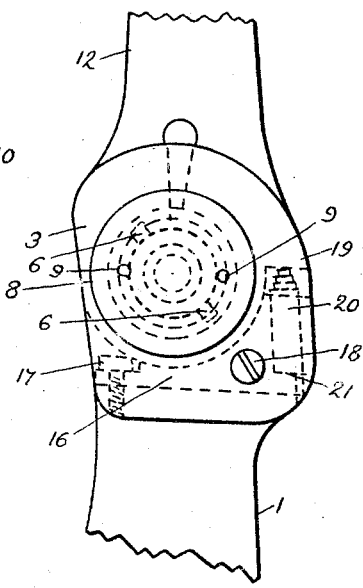
Figure 3:
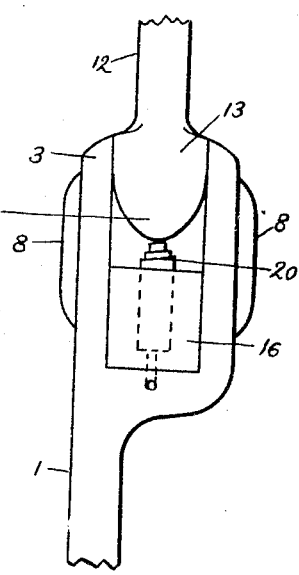
Figure 4:
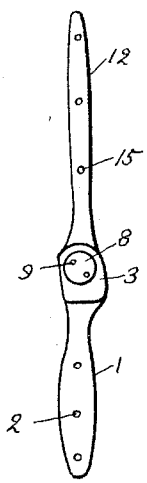

Fig. 1 is a rear view of my device, Fig. 2 is a side elevation, Fig. 3 is a front view of same, and Fig. 4 is an elevation of a complete device shown on a reduced scale.

My device consists of a lower member 1 provided with screw holes 2 for attaching same to the calf portion of an artificial limb and having an enlarged slotted head 3 or clevis. A tapered pin 4 is slidably fitted in the sides of the clevis head 3 and is prevented from turning by means of key slots 5 with keys 6, extending partly into the body of the pin, partly into the body of the clevis side around the pin. The pin has threaded (or tapped) holes at the ends for screws 7 with large flat heads 8. Holes 9 are provided in the heads for turning screws by means of a suitable spanner wrench.

The pin 4 is made shorter than the distance between the outer sides of the clevis, and the remaining space at the small end of the pin is filled with filling or adjusting washers 10. The screw heads 8 are provided with circular recesses 11 on the inside for the ends of the pin 4. The end portions of this pin are made cylindrical in order to facilitate the adjustment of the pin lengthwise in the clevis.

An upper member 12 is provided with a head 13 slidably fitted in the clevis 3 and provided with a tapered hole for the pin 4. Slots 14 are provided to admit the lubricant to the bearing surfaces of the pin 4 and head 13. The member 12 is provided with screw holes 15 for attaching same to the calf portion of an artificial limb.

A rest block 16 is fitted in the slot of the clevis 3 and is fastened with screws 17 and 18. Its upper surface is shaped on the arc of a circle concentric with the pin 4. The lower portion of the head 13 is also shaped on a circle with a small clearance from the curved surface of the block 16.

The rear portion of the head 13 is made straight, this straight portion limiting the turning movement around the pin to about 90 degrees, that is allowing the artificial limb to be bent to that extent to the rear (for instance, in a sitting posture).

The front portion of the head 13 is provided with a shoulder 19 adapted to rest against the upper corner of the block 16.

These portions are arranged so as to limit the movement of the members 1 and 12 in straightening the limb in accordance with the natural limitations of the human knee joint.

In order to avoid shocks and a clinking noise between the shoulder 19 and the block 16, a buffer spring 20 is placed in a hole 21 in the block 16. This spring is preferably made of a flat steel properly hardened so as to withstand a heavy pressure at this point.

In actual service, when the pivoted joint becomes worn out and loose, it is adjusted by loosening both screws 7, removing one or more adjusting washers 10, tightening again the screw at the small end until the joint is properly tightened by drawing the pin toward the small end, and then finally tightening the screw at the large end.

I claim as my invention:

In a mechanical knee movement device for artificial limbs, the combination with a lower member of an upper member, a clevis at the end of one of said members, an enlarged portion at the end of another member, said enlarged portion being slidably fitted in said clevis, and said clevis with said enlarged portion being provided with a common tapered aperture, a tapered pin rotatively fitted in said aperture and being shorter than said common aperture, and provided with central threaded aperture, flat headed bolts screwed into said aperture in the ends of said pin and resting with their heads against the outer sides of said clevis halves, spacing washers on the smaller end of said pin, the inside surface of the bolthead at said smaller end being undercut for said washers, the larger end of said pin being provided with slots, parallel to the axis of said pin and registering with corresponding slots in said clevis, and pins in said slots, the inside surface of the bolthead at the larger end of said tapered pin being provided with circular recess for said pins.

Signed at New York, in the county of New York and State of New York.

ALEXANDER D. SCULLY.